US011862093B2

(12) United States Patent
Mercier et al.

(10) Patent No.: US 11,862,093 B2
(45) Date of Patent: Jan. 2, 2024

(54) DEVICE COMPRISING A DISPLAY SCREEN WITH LOW-CONSUMPTION OPERATING MODE

(71) Applicant: Aledia, Echirolles (FR)

(72) Inventors: Frédéric Mercier, Saint Nicolas de Macherin (FR); Matthieu Charbonnier, Fontaine (FR)

(73) Assignee: Aledia, Echirolles (FR)

( * ) Notice: Subject to any disclaimer, the term of this patent is extended or adjusted under 35 U.S.C. 154(b) by 0 days.

(21) Appl. No.: 17/783,254

(22) PCT Filed: Dec. 2, 2020

(86) PCT No.: PCT/EP2020/084209
§ 371 (c)(1),
(2) Date: Jun. 7, 2022

(87) PCT Pub. No.: WO2021/115860
PCT Pub. Date: Jun. 17, 2021

(65) Prior Publication Data
US 2023/0018962 A1 Jan. 19, 2023

(30) Foreign Application Priority Data
Dec. 12, 2019 (FR) ...................................... 1914283

(51) Int. Cl.
*G09G 3/3258* (2016.01)
*G02F 1/133* (2006.01)
(52) U.S. Cl.
CPC .......... *G09G 3/3258* (2013.01); *G02F 1/133* (2013.01); *G09G 2330/021* (2013.01)

(58) Field of Classification Search
CPC ..................................................... G09G 3/3258
USPC ............................................................ 345/55
See application file for complete search history.

(56) References Cited

U.S. PATENT DOCUMENTS

| 2005/0104818 A1* | 5/2005 | Kwak | G09G 3/3233 345/76 |
| 2010/0053125 A1* | 3/2010 | Kim | G09G 3/20 345/204 |
| 2010/0171734 A1* | 7/2010 | Chiu | G09G 5/36 345/212 |

FOREIGN PATENT DOCUMENTS

| EP | 1 077 442 A1 | 2/2001 |
| FR | 2 842 640 A1 | 1/2004 |

OTHER PUBLICATIONS

International Search Report and Written Opinion for International Application No. PCT/EP2020/084209, dated Feb. 23, 2021.

* cited by examiner

*Primary Examiner* — Long D Pham
(74) *Attorney, Agent, or Firm* — Wolf, Greenfield & Sacks, P.C.

(57) ABSTRACT

A device including a display screen including display pixels arranged in rows and in columns, including a first row and a first column. The device further includes a display screen control circuit configured to, in a first mode, start the display of a first image on the first row and on the first column and, in a second mode, start the display of a second image on one of the rows different from the first row and/or on one of the columns different from the first column.

10 Claims, 4 Drawing Sheets

DEVICE COMPRISING A DISPLAY SCREEN WITH LOW-CONSUMPTION OPERATING MODE

CROSS-REFERENCE TO RELATED APPLICATION

This application is a national stage filing under 35 U.S.C. § 371 of International Patent Application Serial No. PCT/EP2020/084209, filed Dec. 2, 2020, which claims priority benefit to French patent application FR19/14283, filed Dec. 12, 2019. The contents of these applications are incorporated herein by reference in their entireties.

TECHNICAL BACKGROUND

The present disclosure concerns a device comprising a display screen, particularly a display screen having a low-power operating mode.

PRIOR ART

For certain applications, decreasing the electric power consumption of a device comprising a display screen is critical. This may be the case for a standalone virtual reality headset comprising at least one display screen electrically powered by a battery of cells.

It is known to provide a low-power operating mode, also called low-power mode, of a display screen where no image is displayed on the screen. It may however be desirable for a few data to remain displayed on the display screen, for example, the data or the time, even in the low-power mode. Video images displayed in low-power mode are generally of small dimensions with respect to the size of the display screen so that the number of display pixels of the display screen which are to be powered during the image display in low-power mode is decreased, which enables to limit the electric power consumption in low-power mode. It would however be desirable to further decrease the electric power consumption in low-power mode when images of small dimensions are displayed.

SUMMARY

Thus, an object of an embodiment is to provide a device comprising a display screen with a low-power mode which overcomes at least some of the disadvantages of the previously—described devices.

According to another object of an embodiment, the device has a decreased electric power consumption in low-power mode.

According to another object of an embodiment, video images of decreased dimensions are displayed on the display screen in low-power mode.

An embodiment provides a device comprising a display screen comprising display pixels arranged in rows and in columns, including a first row and a first column, the device further comprising a display screen control circuit configured to, in a first mode, start the display of a first image on the first row and on the first column and, in a second mode, start the display of a second image on one of the rows different from the first row and/or on one of the columns different from the first column.

According to an embodiment, the device comprises a shift register comprising a succession of memory cells, including a first memory cell, and a data delivery circuit configured to, in the first mode, deliver in series first image data relative to the first image to the first memory cell and, in the second mode, deliver in series second image data relative to the second image to one of the memory cells other than the first memory cell.

According to an embodiment, the device comprises a first memory having a first binary message comprising first bits stored therein, each first bit being associated with one of the columns of the display screen, a single one of the first bits being in a first state, the other first bits each being in a second state.

According to an embodiment, the device comprises a second memory having a second binary message comprising second bits stored therein, each second bit being associated with one of the rows of the display screen, a single one of the second bits being in a third state, the other second bits each being in a fourth state.

According to an embodiment, the second image comprises image pixels, the number of image pixels being smaller than the number of display pixels of the display screen.

According to an embodiment, each display pixel comprises a display circuit comprising light-emitting diodes and a light-emitting diode control circuit.

According to an embodiment, the control circuit of each display is configured to receive a digital signal or an analog signal.

According to an embodiment, the circuit for controlling the display screen is configured to, in the second mode, start the display of a third image on one of the rows different from the row at which the display of the second image starts.

An embodiment also provides a method of controlling a display screen comprising display pixels arranged in rows and in columns, including a first row and a first column, the method comprising the steps of:

in a first mode, starting the display of a first image on the first row and on the first column; and in a second mode, starting the display of a second image on one of the rows different from the first row and/or on one of the columns different from the first column.

According to an embodiment, the method comprises, in the first mode, the series delivery, to a shift register, comprising a succession of memory cells, including a first memory cell, of first image data relative to the first image onto the first memory cell and, in the second mode, of second image data relative to the second image to one of the memory cells other than the first memory cell.

According to an embodiment, the method comprises, in the second mode, the beginning of the display of a third image on one of the rows different from the row at which the display of the second image starts.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Figure 1A:
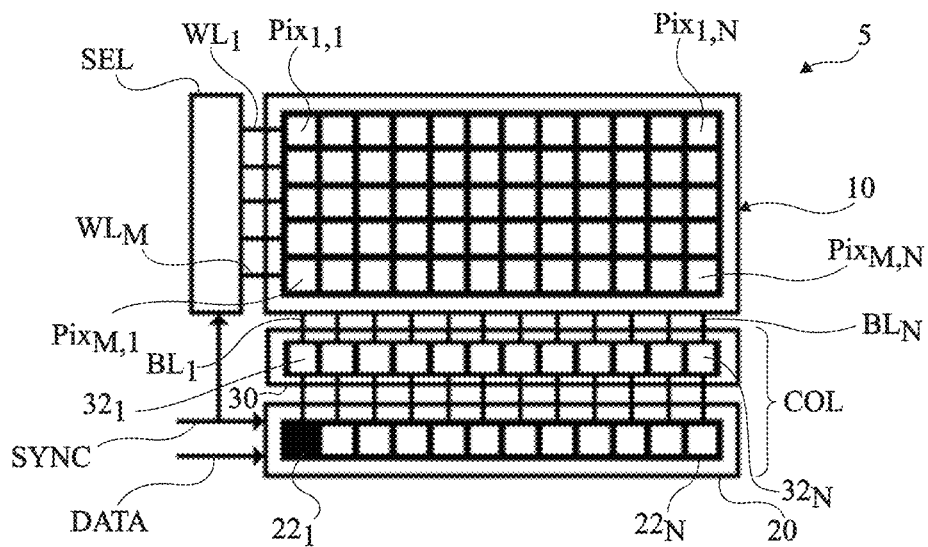
FIG. 1A illustrates a step of a method of displaying an image on a display screen.

Like features have been designated by like references in the various figures. In particular, the structural and/or functional features that are common among the various embodiments may have the same references and may dispose identical structural, dimensional and material properties. For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements. Further, a signal which alternates between a first constant state, for example, a low state, noted "0", and a second constant state, for example, a high state, noted "1", is called a "binary signal". The high and low states of different binary signals of a same electronic circuit may be different. In practice, the binary signals may correspond to voltages or to currents which may not be perfectly constant in the high or low state.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures. Unless specified otherwise, the expressions "around", "approximately", "substantially" and "in the order of" signify within 10%, and preferably within 5%.

A pixel of an image corresponds to the unit element of the image displayed by the display screen. When the display screen is a color image display screen, it generally comprises, for the display of each image pixel, at least three emission and/or light intensity regulation components, also called display sub-pixels, which each emit a light radiation substantially in a single color (for example, red, green, or blue). The superposition of the radiations emitted by the three display sub-pixels provides the observer with the colored sensation corresponding to the pixel of the displayed image. In this case, the assembly formed by the three display sub-pixels used for the display of a pixel of an image is called display pixel of the display screen.

The display of a video on a display screen comprises the display of successive images on the display screen, an image being also called a frame, at a display frequency, also called refreshment frequency, which generally varies between 50 Hz and 240 Hz.

FIGS. 1A to 1D illustrate successive steps of a method of displaying a frame on a display screen 10 of a display device 5. Display screen 10 comprises an array of display pixels $Pix_{i,j}$ arranged in M rows and in N columns, i being an integer varying from 1 to M and j being an integer varying from 1 to N. As an example, M is an integer which varies from 1 to 2,000 and N is an integer which varies from 1 to 4,000. As an example, in FIGS. 1A to 1D, M is equal to 5 and N is equal to 12.

Display device 5 further comprises a selection circuit SEL which is coupled to the display pixels $Pix_{i,j}$ of each row by at least one row electrode $WL_i$ varying from 1 to M. Display device 5 further comprises a data circuit COL coupled to the display pixels $Pix_{i,j}$ of each column electrode $BL_j$, j varying from 1 to N. Data circuit COL may comprise a shift register 20 comprising N memory cells $22_j$, j varying from 1 to N, and a buffer memory 30 comprising N memory cells $32_j$, j varying from 1 to N.

Data circuit COL receives digital image signals DATA containing the information relative to the image pixels to be displayed. Each memory cell $22_j$ and each memory cell $32_j$ may store the digital image signals containing the information relative to a single display pixel. Selection circuit SEL and data circuit COL receive synchronization signals SYNC, for example, binary signals. A first synchronization signal may indicate, for each image pixel, the end of the transmission of the digital image signals DATA relative to this image pixel. A second synchronization signal may indicate, for each row of the frame to be displayed, the end of the transmission of the digital image signals DATA relative to this row. A third synchronization signal may indicate, for each frame to be displayed, the end of the transmission of the digital image signals DATA relative to this frame.

Figure 2:
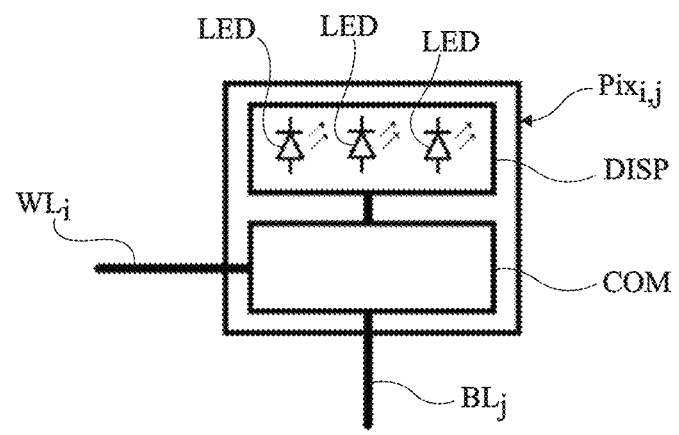
FIG. 2 shows an embodiment of a display pixel of a display screen.

FIG. 2 shows an embodiment of a display pixel $Pix_{i,j}$ comprising a display circuit DISP with light-emitting diodes LED, and a control circuit COM, coupled to row electrode $WL_i$ and to column electrode $BL_j$. Control circuit COM is configured to control the light-emitting diodes LED of display circuit DISP from the digital or analog image signals received from column electrode $BL_j$ when it receives an activation signal from row electrode $WL_i$. Display screen 10 and display pixels $Pix_{i,j}$ may have the structures described in document WO 2019/016481 or WO 2019/016482.

Considering FIGS. 1A to 1D again, the digital image signals DATA relative to the image pixels to be displayed on the first row of display screen 10 are supplied in series to shift register 20, by first memory cell $22_1$, the delivery of the digital signals relative to a new image pixel to memory cell $22_1$ causing the shifting of the digital signals stored in memory cell $22_j$ to the next memory cell $22_{j+1}$.

Figure 1B:
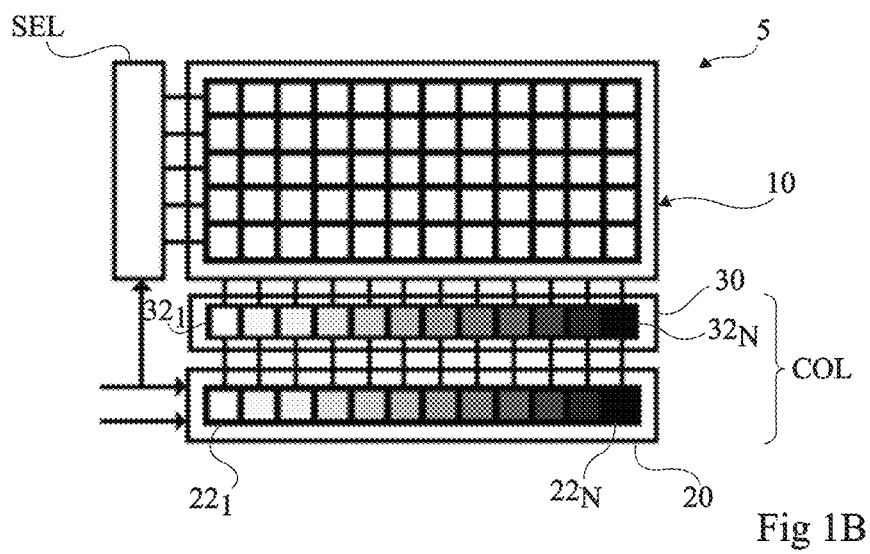
FIG. 1B illustrates another step of the display method.

FIG. 1A schematically shows the digital image signals relative to an image pixel stored in the first memory cell $22_1$ of shift register 20. In FIG. 1B, all the digital image signals relative to the display pixels to be displayed on the first row of display screen 10 have been delivered in series to shift register 20 and the digital image signals stored in each memory cell $22_j$ of shift register 20 have been loaded into the memory cell $32_j$ of buffer memory 30. Further, the display pixels $Pix_{1,j}$, j varying from 1 to N, of the first row have been activated by selection circuit SEL.

Figure 1C:
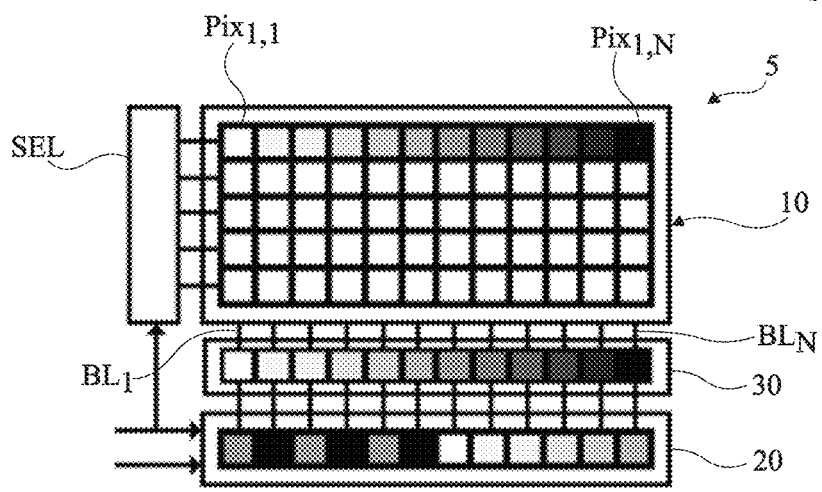
FIG. 1C illustrates another step of the display method.

FIG. 1C shows the display pixels $Pix_{1,j}$, j varying from 1 to N, of the first row displaying the image pixels corresponding to the digital image pixels stored in buffer memory and transmitted, in digital or analog form, to display pixels $Pix_{1,j}$ by column electrodes $BL_1$ to $BL_N$. Preferably, display pixels $Pix_{1,j}$ keep on displaying the display pixels relative to the digital signals that they have received as long as they are not selected again by selection circuit SEL. Simultaneously, digital image signals relative to the display pixels to be displayed on the second row of display screen 10 are delivered in series to shift register 20.

Figure 1D:
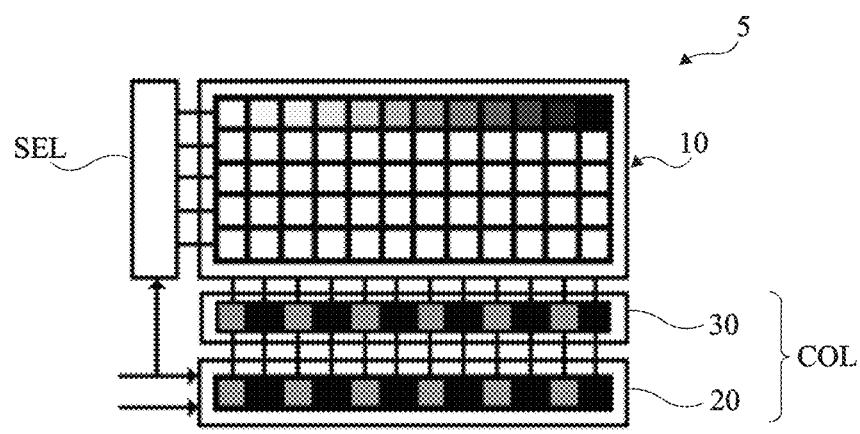
FIG. 1D illustrates another step of the display method.

In FIG. 1D, all the digital image signals relative to the display pixels to be displayed on the second row of display screen 10 have been delivered in series to shift register 20 and the digital image signals stored in shift register 20 have been loaded into buffer memory 30. The display pixels $Pix_{2,j}$, with j varying from 1 to N, of the second row are then selected by selection circuit SEL. The previously-described steps are repeated until the $M^{th}$ row of display screen 10. Selection circuit SEL then receives a synchronization signal SYNC indicating the frame end and then selects again the first row of display screen 10 for the display of the next frame.

Figure 3:
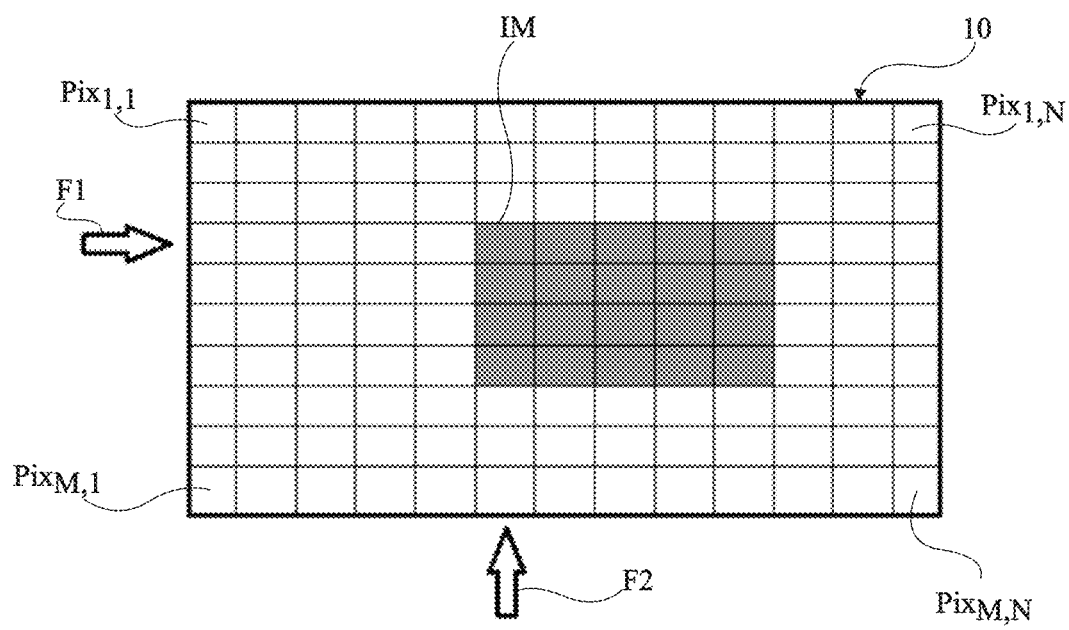
FIG. 3 illustrates the principle of the display of an image of decreased dimensions on a display screen.
Figure 4:
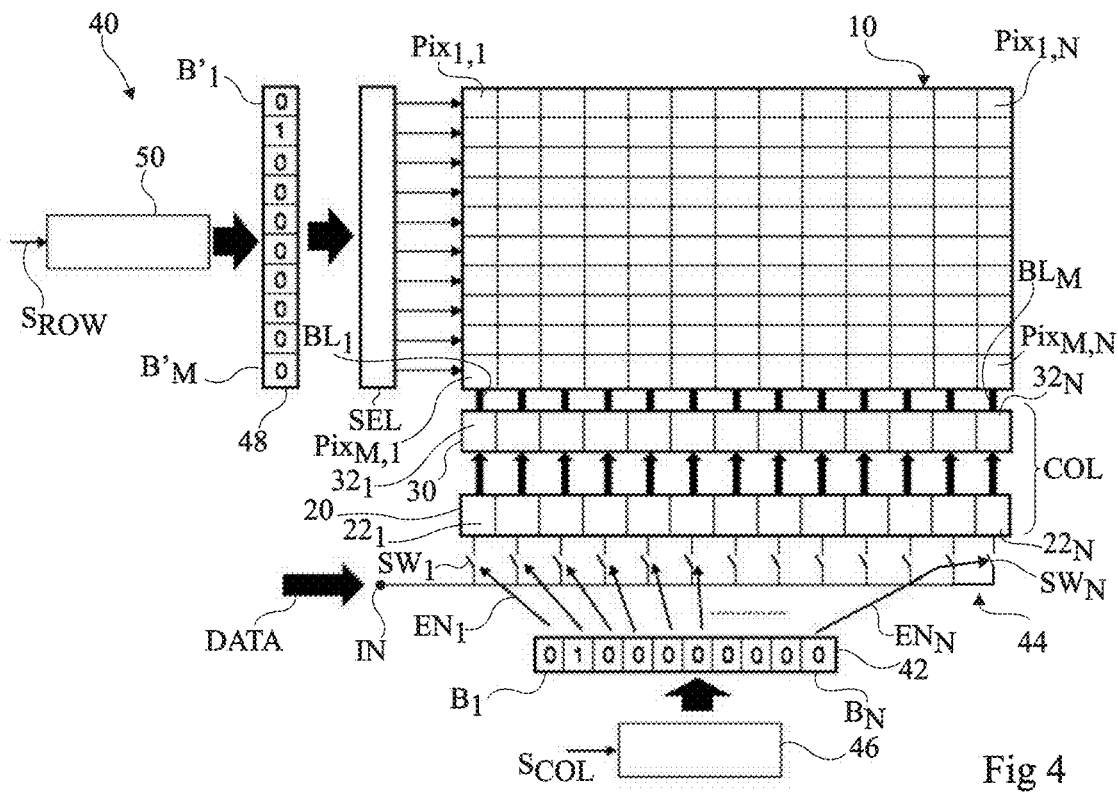
FIG. 4 partially and schematically shows an embodiment of a device with a display screen having a low-power mode.

FIG. 3 illustrates an embodiment of a method of displaying an image IM of decreased dimensions, called reduced image IM hereafter, on display screen 10 in a low-power mode. Image IM is called reduced since the number of image pixels of image IM is smaller than the number of display pixels of display screen 10. More particularly, the number of rows of image pixels of image IM is smaller than the number M of rows of display screen and/or the number of columns of image pixels of image IM is smaller than the number N of columns of display screen 10. According to an embodiment, selection circuit SEL is controlled to start the display of reduced image IM at a row of number K, indicated by arrow F1 in FIG. 3, other than the first row of display screen 10, and/or data circuit COL only delivers digital image signals from a column of number L, indicated by arrow F2 in FIG. 3, different from the first column of display screen 10. This advantageously enables to decrease the number of display pixels of the display screen to be activated for the display of an image in low-power mode. FIG. 4 partially and schematically shows an embodiment of a display device 40 with a low-power mode in the case where the image signals delivered to display pixels $Pix_{i,j}$ are digital signals and FIG. 5 partially and schematically shows a variant of display device 40 with a low-power mode in the case where the image signals delivered to display pixels $Pix_{i,j}$ are analog signals.

Display device 40 comprises all the elements of the display device 5 shown in FIG. 1A. In the case where the image signals delivered to display pixels $Pix_{i,j}$ are digital signals (FIG. 4), each memory cell $32_j$, j varying from 1 to N, of buffer memory 30 may be directly coupled to column electrode $BL_j$. In the case where the image signals delivered to display pixels $Pix_{i,j}$ are analog signals (FIG. 5), each memory cell $32_j$, j varying from 1 to N, of buffer memory 30 may be coupled to column electrode $BL_j$ via a digital-to-analog converter $41_j$ (DAC).

Display device 40 further comprises a memory 42, also called register, and a routing circuit 44 receiving as an input digital image signals DATA and delivering digital image signals DATA to one of memory cells $22_1$ to $22_N$ of shift register 20 according to the signal stored in memory 42. According to an embodiment, memory 42 comprises N bits, $B_1$ to $B_N$, a single bit $B_j$ of memory 42 being at "1", all the other bits of memory 42 being at "0", and the rank j of the memory cell $22_j$ having the digital image signals DATA delivered thereto is the same as the bit $B_j$ of memory 42 which is at "1". Display device 40 further comprises a module 46 configured to receive a signal $S_{COL}$ representative of the first column of display screen 10 from which reduced image IM is to be displayed and configured to store in memory 42 a signal representative of signal $S_{COL}$.

According to an embodiment, routing circuit 44 comprises N switches $SW_1$ to $SW_N$. Each switch $SW_j$, j varying from 1 to N, couples an input node IN, receiving digital image signals DATA, to a terminal of switch $SW_j$, the other terminal of switch $SW_j$ being coupled to memory cell $22_j$. Each switch $SW_j$, j varying from 1 to N, is controlled by a control signal $EN_j$ delivered from the bit $B_j$ stored in memory 42. According to an embodiment, when bit $B_j$ is at "1", signal $EN_j$ controls the turning-on of switch $SW_j$ and when bit $B_j$ is at "0", signal $EN_j$ controls the turning-off of switch $SW_j$. A single one of bits $B_1$ to $B_N$ is at "1" so that a single one of switches $SW_1$ to $SW_N$ is on. In FIG. 4, routing circuit 44 is described with N switches $SW_1$ to $SW_N$. However, routing circuit 44 may comprise less than N switches. As a variant, routing circuit 44 is configured to deliver digital image signals DATA only to one of memory cells $22_j$, j varying from 1 to Q, Q being an integer smaller than N.

According to another embodiment, memory 42 comprises a number nbits of bits such that N is smaller than number 2 raised to power nbits, for example, 16 bits, and the rank j of the memory cell $22_j$ having digital image signals DATA provided thereto is stored in memory 42. Control signals $EN_j$, j varying from 1 to N, are then delivered by logic circuits, not shown, based on the data stored in memory 42, so that switch $SW_j$ is on and all the other switches of routing circuit 44 are off.

Display device 40 further comprises a memory 48, also called register, selection circuit SEL being configured to select, for the display of the first row of a new frame, first the row of display screen 10 according to the signal stored in memory 48. According to an embodiment, memory 48 comprises M bits, $B'_1$ to $B'_M$, a single bit $B'_i$ of memory 48 being at "1", all the other bits of memory 48 being at "0", and the rank i of the row which is selected first is the same as the index of the bit $B'_i$ of memory 48 which is at "1". In the same way as for memory 42, in another embodiment, memory 48 contains the rank i of the row which has been selected first. Selection circuit SEL comprises a module 50 configured to receive a signal of indication of the first row $S_{ROW}$ of display screen 10 to be selected and configured to store in memory 48 a message adapted to signal $S_{ROW}$.

In a normal operating mode, where each displayed frame has the same dimensions as display screen 10, that is, the same number of image pixel rows as the number of display pixel rows of display screen 10 and the same number of image pixel columns as the number of display pixel columns of display screen 10, signal $S_{ROW}$ indicates that the row to be selected for the display of the first row of a new frame is the first row of display screen 10 and signal $S_{COL}$ indicates that the column of screen 12 from which each new frame is to be displayed is the first column of display screen 10.

In the low-power mode, where each displayed frame has dimensions smaller than those of display screen 10, the row of display screen 10, designated by signal $S_{ROW}$, to be selected for the display of the first row of the frame may be different from the first row of display screen 10 and the column of display screen 10, designated by signal $S_{COL}$, from which the frame should be displayed may be different from the first column of display screen 10.

Figure 5:
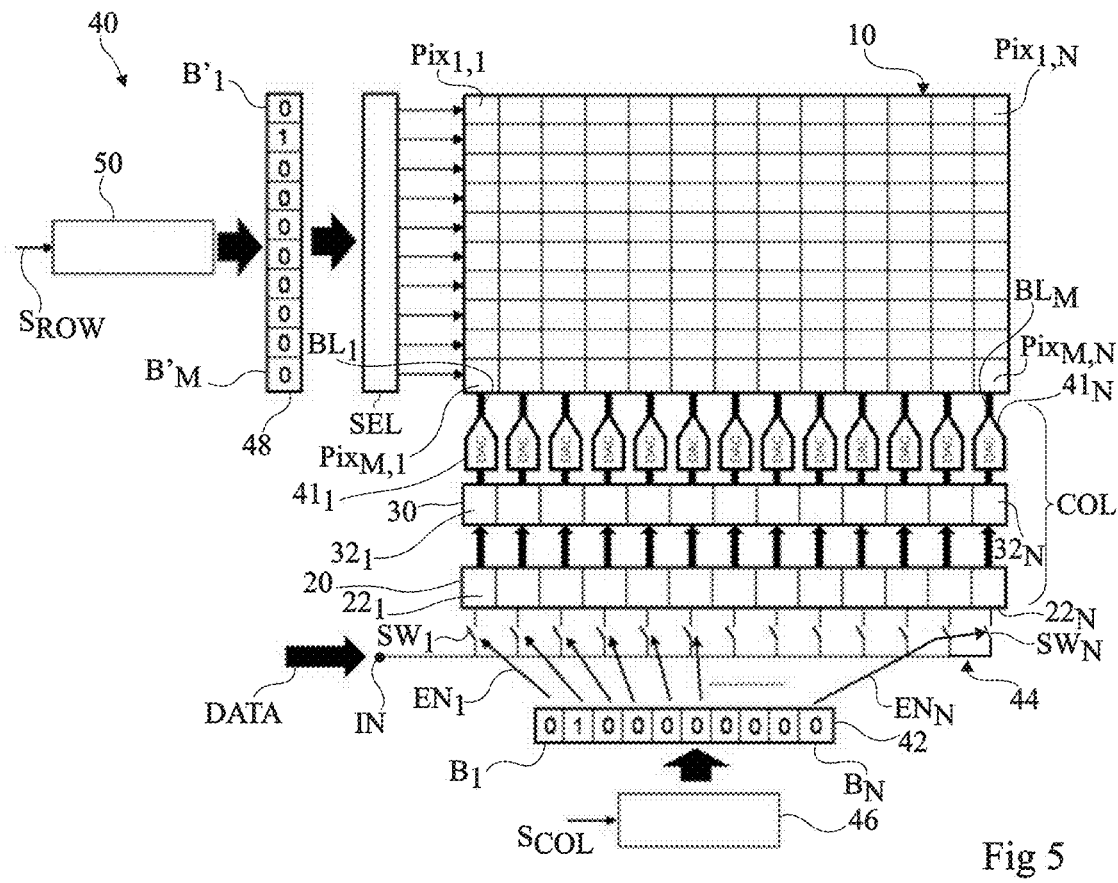
FIG. 5 partially and schematically shows a variant of the device shown in FIG. 4.
Figure 6:
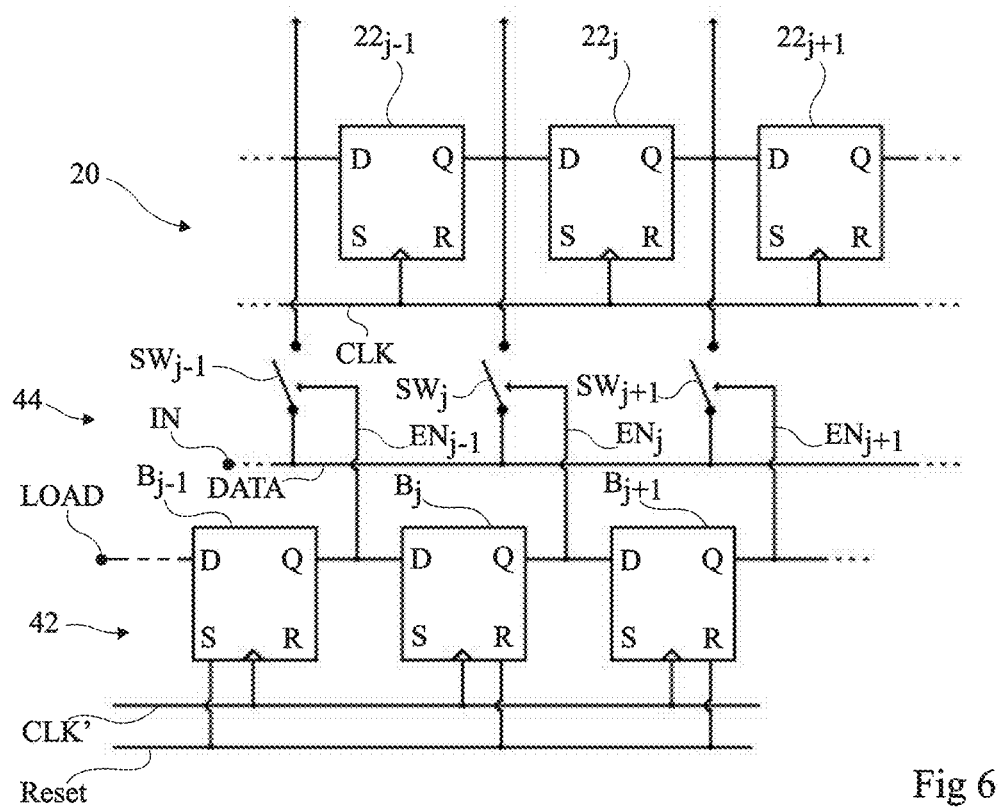
FIG. 6 partially and schematically shows an embodiment of the routing circuit of the device shown in FIG. 4 or 5.

FIG. 6 partially and schematically shows a more detailed embodiment of a portion of the shift register 20, of the routing circuit 44, and of the memory 42 shown in FIG. 4 or 5. In this embodiment, each memory cell $22_j$, j varying from 1 to N, corresponds to a D-type flip-flop, three memory cells $22_{j-1}$, $22_j$, and $22_{j+1}$ being shown as an example in FIG. 6. Each flip-flop $22_j$ comprises a data input D, two set inputs R and S, two complementary outputs, a single output Q being shown, and is rated by a clock signal CLK. The D input of memory cell $22_j$ is coupled to the Q output of memory cell 241. Further, each memory cell $B_j$, with j varying from 1 to N, corresponds to a D-type flip-flop, three memory cells $B_{j-1}$, $B_j$, and $B_{j+1}$ being shown as an example in FIG. 6. Each flip-flop $B_j$ comprises a D data input, two set inputs R and S, two complementary outputs, a single output Q being shown, and is rated by a clock signal CLK'. The D input of memory cell $B_j$ is coupled to the Q output of memory cell $B_{j-1}$.

The truth table [Table 1] of each memory cell $22_j$ and $B_j$ is the following:

TABLE 1

| S | R | D | $Q_{n+1}$ |
|---|---|---|---|
| 0 | 0 | 0 | 0 |
| 0 | 0 | 1 | 1 |
| 1 | 0 | x | 1 |
| 0 | 1 | x | 0 |
| 1 | 1 | NA | NA |

Each switch $SW_j$ may be controlled by a signal $EN_j$ and is configured to couple input node IN to the D input of flip-flop $SW_j$ when signal $EN_j$ is at "1". Signal $EN_j$ is delivered by the Q output of memory cell $B_j$. A reset signal Reset is delivered to the R input of each memory cell $B_j$, j varying from 2 to N, and to the S input of memory cell $B_1$ (shown as an example by memory cell $B_{j-1}$ in FIG. 6). This enables, during a reset step, the display of an image to start at the first column of the display screen by default. The information of the column of screen 10 from which each new frame should be displayed in the low-power mode is loaded into memory 42 via a LOAD input coupled to the D input of first memory cell $B_1$.

In the embodiment previously described in relation with FIG. 5, memory cells $22_j$ and $B_j$ are formed by D flip-flops. However, memory cells $22_j$ and $B_j$ may be formed with other types of flip-flops or of logic latches.

In the previously-described embodiments, in the low-power mode, a single reduced image is displayed on display screen 10.

According to an embodiment, two or more than two reduced images, each having dimensions smaller than the dimensions of display screen 10, may be displayed on display screen 10 in low-power mode.

Figure 7:
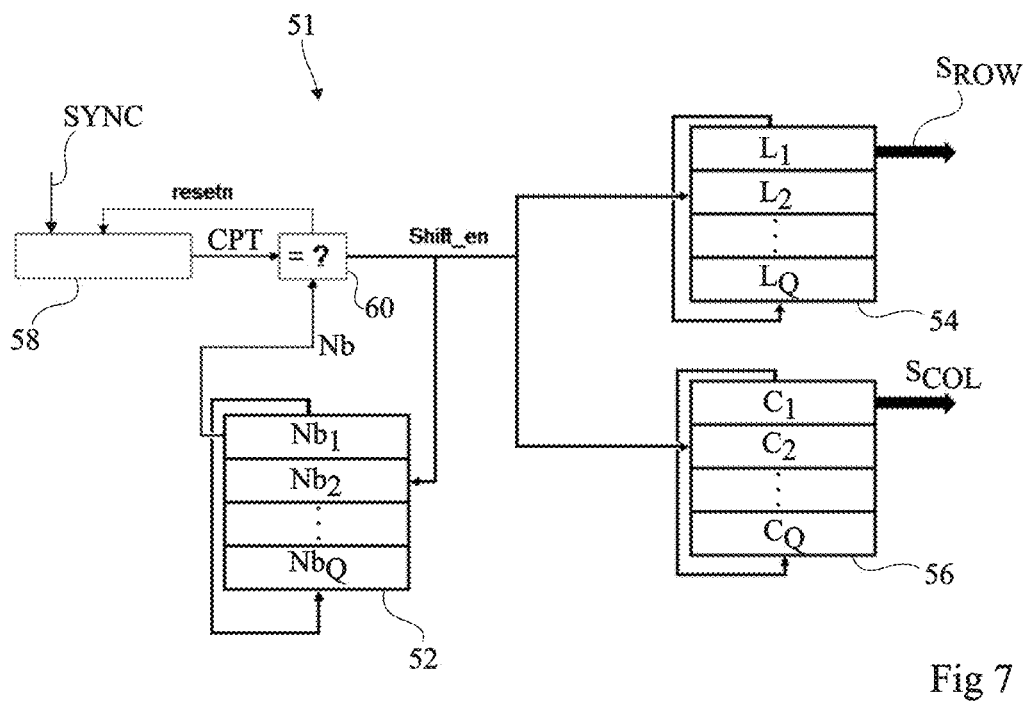
FIG. 7 partially and schematically shows an embodiment of a circuit for the display of at least two images on a display screen in low-power mode.

FIG. 7 shows an embodiment of a circuit 51 for delivering signals $S_{ROW}$ and $S_{COL}$ in the case where P reduced images are to be displayed on the display screen in low-power mode, P being an integer greater than or equal to 2, for example, varying from 2 to 10. Circuit 51 comprises a memory 52 having, for the $k^{th}$ reduced image with k varying from 1 to Q, data representative of the integral number $Nb_k$ of rows of the reduced image stored therein. Memory 52 delivers a signal Nb equal to one of values $Nb_k$. Circuit 51 comprises a memory 54 having, for the $k^{th}$ reduced image with k varying from 1 to Q, data representative of the first row $L_k$ of display screen 10 at which the first row of the reduced image should be displayed stored therein. Memory 54 delivers signal $S_{ROW}$ equal to one of values $L_k$. Circuit 51 comprises a memory 56 having, for the $k^{th}$ reduced image with k varying from 1 to Q, data representative of the first column $C_k$ of display screen 10 at which the first column of the reduced image should be displayed stored therein. Memory 56 delivers signal $S_{COL}$ equal to one of values $C_k$.

According to an embodiment, each memory 52, 54, and 56 is controlled by a signal Shift_en. According to an embodiment, signal Shift_en is a binary signal. As an example, when signal Shift_en does not vary, the signals $S_{ROW}$, $S_{COL}$, and Nb delivered by memories 52, 54, and 56 are not modified, and when signal Shift_en switches from "0" to "1", the signals $S_{ROW}$, $S_{COL}$, and Nb delivered by memories 52, 54, and 56 are modified. As an example, when memory 52 delivers signal Nb equal to value $Nb_k$, with k smaller than Q, it may deliver signal Nb equal to value $Nb_{k+1}$ on reception of a pulse of signal Shift_en. Further, when memory 54 delivers signal $S_{ROW}$ equal to value $L_k$, with k smaller than Q, it may deliver signal $S_{ROW}$ equal to $L_{k+1}$ on reception of a pulse of signal Shift_en. Further, when memory 56 delivers signal $S_{COL}$ equal to value $C_k$, with k smaller than Q, it may deliver signal Scot, equal to value $C_k+1$ on reception of a pulse of signal Shift_en.

According to an embodiment, circuit 51 further comprises a counter 58 which increments a signal CPT and a module 60 receiving signals CPT and Nb, delivering signal Shift_en, and delivering a reset signal resetn to counter 58. Counter 58 increments signal CPT each time it receives an end-of-frame synchronization signal SYNC. According to an embodiment, module 60 is configured to compare counter CPT with the number Nb supplied by memory 52 and is configured to emit a pulse of signal Shift_en when signal CPT is equal to number Nb and to reset counter 58. Signals Nb, $S_{ROW}$ and $S_{COL}$ are thus modified for each new reduced image to be modified.

Various embodiments and variants have been described. Those skilled in the art will understand that certain features of these various embodiments and variants may be combined, and other variants will occur to those skilled in the art. Finally, the practical implementation of the described embodiments and variants is within the abilities of those skilled in the art based on the functional indications given hereabove.

The invention claimed is:

1. Device comprising a display screen comprising display pixels arranged in rows and in columns, including a first row and a first column, the device further comprising a display screen control circuit configured to, in a first mode, start the display of a first image on the first row and on the first column and, in a second mode, start the display of a second image on one of the rows different from the first row and/or on one of the columns different from the first column, and
  a shift register comprising a succession of memory cells, including a first memory cell, and a data delivery circuit configured to, in the first mode, deliver in series first image data relative to the first image to the first memory cell and, in the second mode, deliver in series second image data relative to the second image to one of the memory cells other than the first memory cell.

2. Device according to claim 1, comprising a first memory having a first binary message comprising first bits stored therein, each first bit being associated with one of the columns of the display screen, a single one of the first bits being in a first state, the other first bits each being in a second state.

3. Device according to claim 1, comprising a second memory having a second binary message comprising second bits stored therein, each second bit being associated with one of the rows of the display screen, a single one of the second bits being in a third state, the other second bits each being in a fourth state.

4. Device according to claim 1, wherein the second image comprises image pixels, the number of image pixels being smaller than the number of display pixels of the display screen.

5. Device according to claim 1, wherein each display pixel comprises a display circuit comprising light-emitting diodes and a light-emitting diode control circuit.

6. Device according to claim 5, wherein the control circuit of each display pixel is configured to receive a digital signal or an analog signal.

7. Device according to claim 1, wherein the circuit for controlling the display screen is configured to, in the second mode, start the display of a third image on one of the rows different from the row at which the display of the second image starts.

8. Device according to claim 1, comprising a first memory having a first binary message comprising first bits stored therein, each first bit being associated with one of the columns of the display screen, a single one of the first bits being in a first state, the other first bits each being in a second state.

9. Method of controlling a display screen comprising display pixels arranged in rows and in columns, including a first row and a first column, the method comprising the steps of:

in a first mode, starting the display of a first image on the first row and on the first column;

in a second mode, starting the display of a second image on one of the rows different from the first row and/or on one of the columns different from the first column, and comprising, in the first mode, delivering in series, to a shift register, comprising a succession of memory cells, including a first memory cell, first image data relative to the first image onto the first memory cell and, in the second mode, second image data relative to the second image to one of the memory cells other than the first memory cell.

10. Method according to claim 9, comprising, in the second mode, the beginning of the display of a third image on one of the rows different from the row at which the display of the second image starts.

\* \* \* \* \*